US009350086B2

(12) United States Patent
Bradstreet

(10) Patent No.: US 9,350,086 B2
(45) Date of Patent: May 24, 2016

(54) SHAPED LENS ANTENNA FOR DIRECTION FINDING AT THE KA-BAND

(71) Applicant: SRC, Inc., North Syracuse, NY (US)

(72) Inventor: Lance Bradstreet, Liverpool, NY (US)

(73) Assignee: SRC, INC., North Syracuse, NY (US)

( * ) Notice: Subject to any disclaimer, the term of this patent is extended or adjusted under 35 U.S.C. 154(b) by 727 days.

(21) Appl. No.: 13/673,697

(22) Filed: Nov. 9, 2012

(65) Prior Publication Data

US 2014/0132448 A1 May 15, 2014

(51) Int. Cl.

*G01S 5/02* (2010.01)
*H01Q 25/02* (2006.01)
*H01Q 15/08* (2006.01)

(52) U.S. Cl.

CPC ............... *H01Q 25/02* (2013.01); *H01Q 15/08* (2013.01)

(58) Field of Classification Search

CPC ............................... H01Q 25/02; H01Q 15/08
USPC ........................................................ 342/427
See application file for complete search history.

(56) References Cited

U.S. PATENT DOCUMENTS 3,594,811 A * 7/1971 Pierrot .................. H01Q 25/02 342/350
3,729,742 A * 4/1973 Boyns .......................... 342/374
4,153,886 A * 5/1979 Miedema ...................... 333/156
4,318,107 A 3/1982 Pierrot et al.
4,595,926 A 6/1986 Kobus et al.
4,649,391 A 3/1987 Tsuda et al.
4,797,684 A 1/1989 Bernstein et al.
5,017,929 A * 5/1991 Tsuda .......................... 342/427
5,079,557 A * 1/1992 Hopwood et al. ............ 342/373
5,201,065 A 4/1993 Niehenke
5,241,317 A * 8/1993 Howard ........................ 342/149
5,504,493 A * 4/1996 Hirshfield ..................... 342/372
5,929,819 A 7/1999 Grinberg
5,933,120 A 8/1999 Manasson et al.
6,031,501 A 2/2000 Rausch et al.

(Continued)

FOREIGN PATENT DOCUMENTS

EP 0237110 A1 9/1987
JP 4279877 A 10/1992
JP 5180923 A 7/1993

OTHER PUBLICATIONS

Millitech, Gaussian Optics Lens Antenna, Millimeter-Wave Technology & Solutions, http://www.millitech.com/pdfs/specsheets/IS000021-GOA.pdf.

(Continued)

*Primary Examiner* — Frank J McGue
(74) *Attorney, Agent, or Firm* — Bond Schoeneck & King, PLLC; Daniel Malley; George McGuire

(57) ABSTRACT

A high gain antenna for direction finding in the Ka-band. The antenna consists of a lens antenna fed by two micro strip patch antennas. The printed patch antennas are fed by a 180 degree hybrid coupler having four ports, with two ports connected to the feeds of the patch antennas and the other two ports connected to the receiver/exciter. The hybrid sums the signals from the patches and subtracts the signals from the patches to form sum and difference channels. By comparing the sum and difference channels, a user can determine whether the signal entered through the main beam. For example, if the sum signal is greater than the difference signal, the signal is in the main beam. If not, the signal came from another angle.

10 Claims, 5 Drawing Sheets

(56) References Cited

U.S. PATENT DOCUMENTS

| | | | | |
|---|---|---|---|---|
| 6,195,035 | B1 | 2/2001 | Wood | |
| 6,317,092 | B1 | 11/2001 | de Schweinitz et al. | |
| 6,339,406 | B1 | 1/2002 | Nesic et al. | |
| 6,473,049 | B2 | 10/2002 | Takeuchi et al. | |
| 6,680,698 | B2 | 1/2004 | Eiges | |
| 6,690,333 | B2 | 2/2004 | Eiges | |
| 7,061,447 | B1 | 6/2006 | Bozler et al. | |
| 2008/0180336 | A1 * | 7/2008 | Bauregger | 343/753 |
| 2010/0060521 | A1 | 3/2010 | Hayes et al. | |

OTHER PUBLICATIONS

Eleftheriades et al., ALPSS: A millimetre-wave aperture-coupled patch antenna on a substrate lens, Electronics Letters, Jan. 30, 1997, vol. 33, No. 3, pp. 169-170.

Dielectric Lens Shaping and Coma-Correction Zoning, Part I: Analysis: IEEE Transactions on antenna and propagation, pp. 221, vol. AP-31, No. 1, Jan. 1983.

Godi et al., "Performance of Reduced Size Substrate Lens Antennas for Millimeter-Wave Communications" IEEE Transactions on Antennas and Propagation, Apr. 2005, vol. 53(4):1278-1286.

Sangawa et al., "A Ka-Band High-Efficiency Dielectric Lens Antenna With a Silicon Micromachined Microstrip Patch Radiator" 2001 IEEE MTT-S International Microwave Symposium Digest, 2001, 389-392.

Sletten et al., "A new Satellite Tracking Antenna" WESCON/57 Conference Record, Aug. 1957, 244-261.

Holley et al., "An Electronically Scanned Beacon Antenna" IEEE Transactions on Antennas and Propagation, Jan. 1974, vol. 22(1):3-12.

Natarov et al., "Combined Reflector—Lens Monopulse Antenna" 4th International Conference on Antenna Theory and Techniques, Sep. 2003, 251-254.

Wang et al., "Dielectric Lens Antennas Designed for Millimeter-Wave Monopulse System" International Conference on Microwave and Millimeter Wave Technology, Apr. 2007.

* cited by examiner

SHAPED LENS ANTENNA FOR DIRECTION FINDING AT THE KA-BAND

STATEMENT OF GOVERNMENT INTEREST

This work derives from research under Government Contract W15P7T-08-C-V406. The U.S. Government has rights in this invention.

BACKGROUND OF THE INVENTION

1. Field of the Invention

The present invention relates to Ka-band antennas and, more specifically, to a shaped lens antenna for improved direction finding.

2. Description of the Related Art

A lens antenna, such as a dielectric lens antenna, is used for focusing radiated energy in a particular direction. In order to provide direction finding capabilities, however, such systems generally require expensive part or manufacturing techniques. Accordingly, there is a need in the art for a low cost and low loss antenna design for direction-finding at Ka-band.

BRIEF SUMMARY OF THE INVENTION

The present invention comprises a high gain antenna solution for direction finding in the Ka-band. The antenna consists of a lens that is shaped to specific sum and difference patterns and additionally acts as a radome. The antenna further comprises an antenna beamformer comprised of two microstrip patch antennas fed by a 180 degree hybrid coupler having four ports. Two ports are connecting to the antennas feeds and the other two ports connected to the receiver/exciter. The hybrid coupler sums the signals from the patches and subtracts the signals from the patches to form the sum and difference channels. By comparing the sum and difference patterns, it is possible to determine whether the signal entered through the main beam. If the sum signal is greater than the difference signal, the signal is in the main beam. Otherwise, the signal came from another angle.

BRIEF DESCRIPTION OF THE SEVERAL VIEWS OF THE DRAWING(S)

The present invention will be more fully understood and appreciated by reading the following Detailed Description in conjunction with the accompanying drawings, in which.

DETAILED DESCRIPTION OF THE INVENTION

Figure 1:
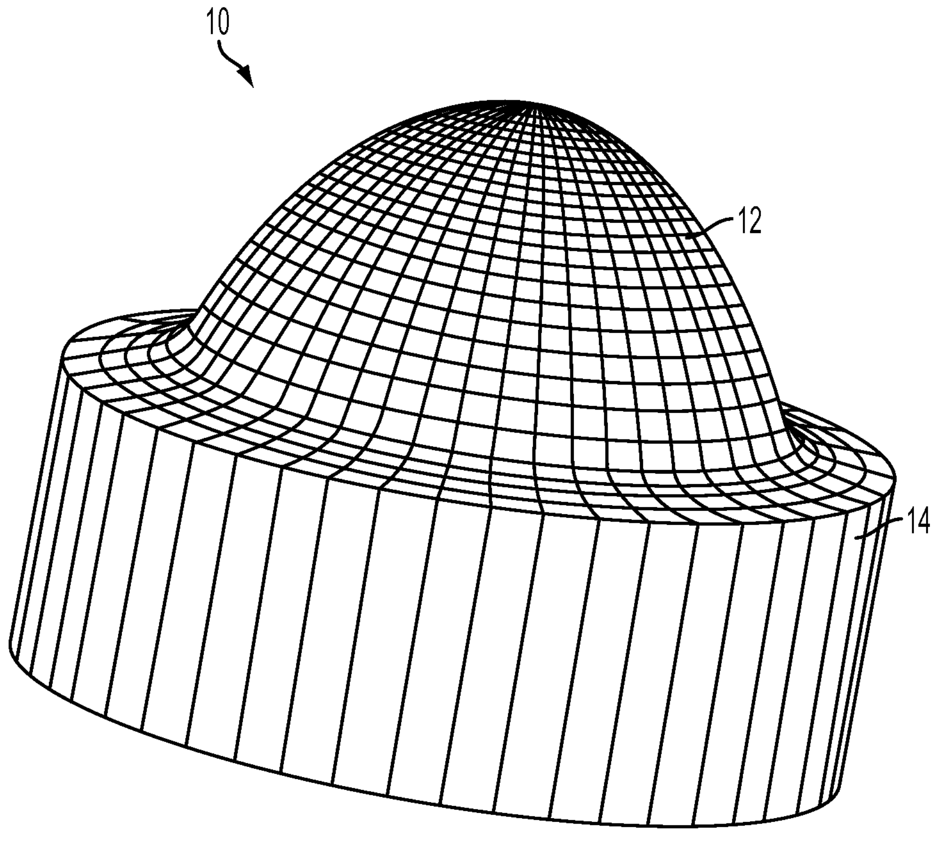
FIG. 1 is a perspective view of an antenna having a shaped lens according to the present invention.
Figure 2:
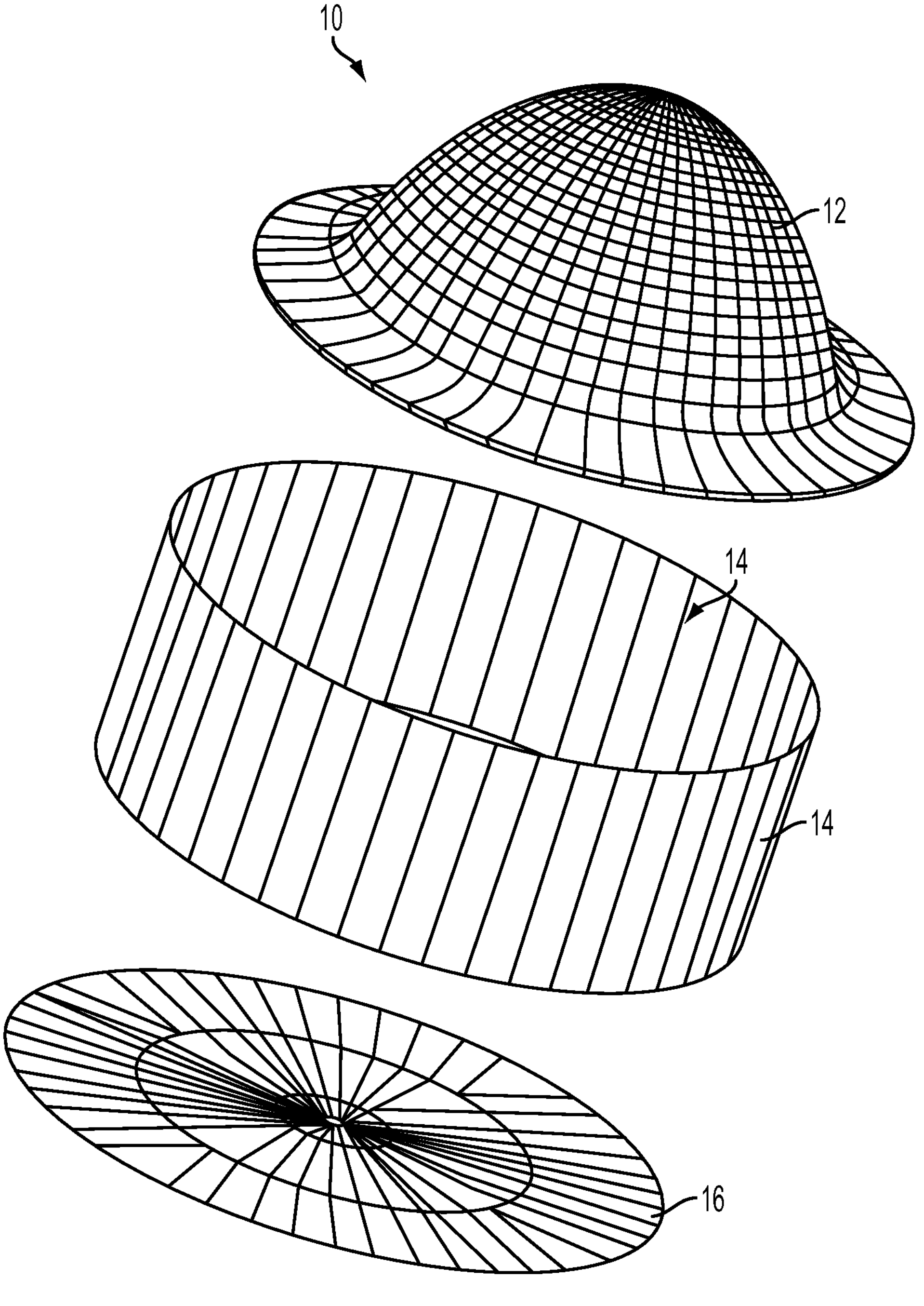
FIG. 2 is an exploded, perspective view of an antenna having a shaped lens according to the present invention.

Referring now to the drawings, wherein like reference numerals refer to like parts throughout, there is seen in FIG. 1 an antenna 10 according to the present invention. Referring to FIG. 2, antenna 10 comprises a lens 12, a housing 14 having a base and an upstanding side or sides to form a cavity 16 therein, and a beamformer assembly 18 positioned in housing

14. Lens 12 is shaped to form specific sum and difference beam patterns so that the difference beam has a higher gain than the sum beam when outside of the main beam. For example, lens 12 may be shaped to apply a Taylor weighting to the beam patterns. Lens 12 also serves as a radome protecting beamformer assembly 18. Housing 14 supporting lens 12 can also be an extension of or integrally formed with the portion of housing 14 used to contain the electronics.

Lens 12 can be injection molded or milled, and also acts as a radome to protect beamformer assembly 18 and associated electronics positioned inside the antenna. Lens 12 may be shaped by using an algorithm that takes into account the patterns from the feed. The feed patterns are used, along with Snell's law, to shape lens 12 to redistribute the power across the aperture to form the designated weighting function while still collimating the beam. Normally, a lens is used for only collimation. In this case, lens 12 is also used to modify the magnitude distribution. Because the rays inside lens 12 are being redirected instead of absorbed, the weighting function is also very efficient. This is performed for a single spline of the lens due to rotational symmetry. The calculation of the shape of lens 12 involving Snell's law assumes a dielectric constant commensurate with REXOLITE® available from C-Lec Plastics, Inc. of Pennsylvania, for example, which is a polystyrene microwave plastic that may be used to form lens 12.

The feed electronics and beamformer may be printed in copper and directed connected to conventional receiver/exciter electronics to reduce cost and losses in antenna 10. For simple operation, the two output ports of antenna 10 may be connected to an off-the-shelf Ka band power meter, such as a Rohde Schwarz NRP-Z31, with a filter in between, to directly measure the sum and different beam levels. These levels can then be compared and the signal direction located when the sum signal becomes greater than the difference signal. More advanced operations may include an integrated receiver with filters, low noise amplifiers (LNAs), and a downconversion chain.

By comparing the difference and sum beams received by antenna 10, it is possible to determine whether or not a signal entered through the main beam. For example, if the sum signal is greater than the difference signal, the signal is in the main beam. If not, the signal came from another angle. Thus, the present invention uses the sum and difference pattern for direction finding purposes. Alternatively, the sum and difference pattern may also be used for monopulse angle estimation. This arrangement, however, would result in greater angle accuracy but would be accompanied by higher complexity and increased cost. This type of system would involve an integrated receiver and exciter and would use antenna 10 for transmit as well as receive. Ancillary components would also be needed, such as a circulator, filters, LNAs, switches, etc. The system would then need to be calibrated to relate the ratio of the sum and difference channels to a particular angle.

Figure 3:
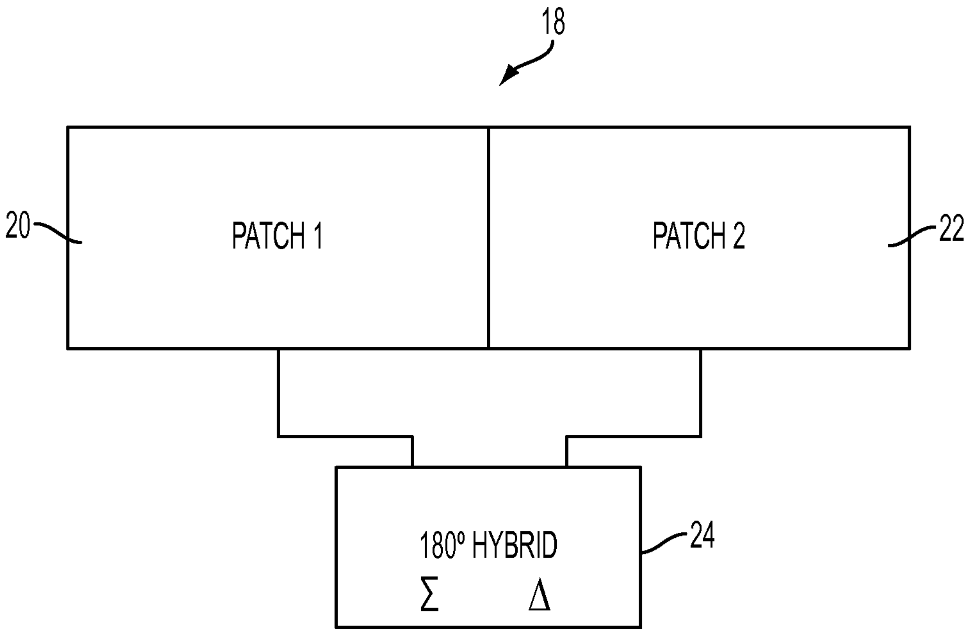
FIG. 3 is a schematic of the design of the beamformer assembly for an antenna according to the present invention.
Figure 4:
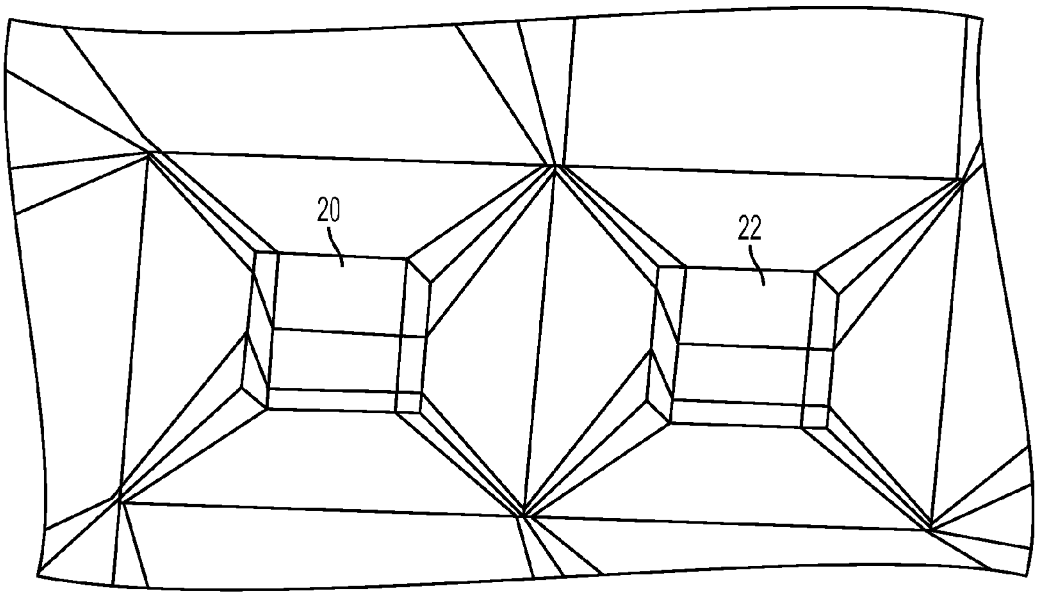
FIG. 4 is a schematic of feed patch antennas having right-hand circular polarization according to the present invention.

Referring to FIGS. 3 and 4, beamformer assembly 18 comprises two microstrip patch antennas 20 and 22. Patch antennas 20 and 22 can be modified to radiate linear polarization, left-hand circular polarization, or right-hand circular polarization. Patch antennas 20 and 22 are fed by a 180 degree hybrid coupler 24, which is a four port device having two ports connected to the feeds of patch antennas 20 and 22 and the other two ports connected to a conventional receiver/exciter (not shown), or filter and power meter as described above. Hybrid coupler 24 sums the signals from patch antennas 20 and 22, and subtracts the signals from patch antennas 20 and 22 to form the sum and difference channels. Lens 12 is shaped to match the pattern of the feed antennas so that the pattern of the feed antennas is an integral part of the design of lens 12. Hybrid coupler 24 may be designed in copper on the same board stackup as the patch antennas.

Figure 5:
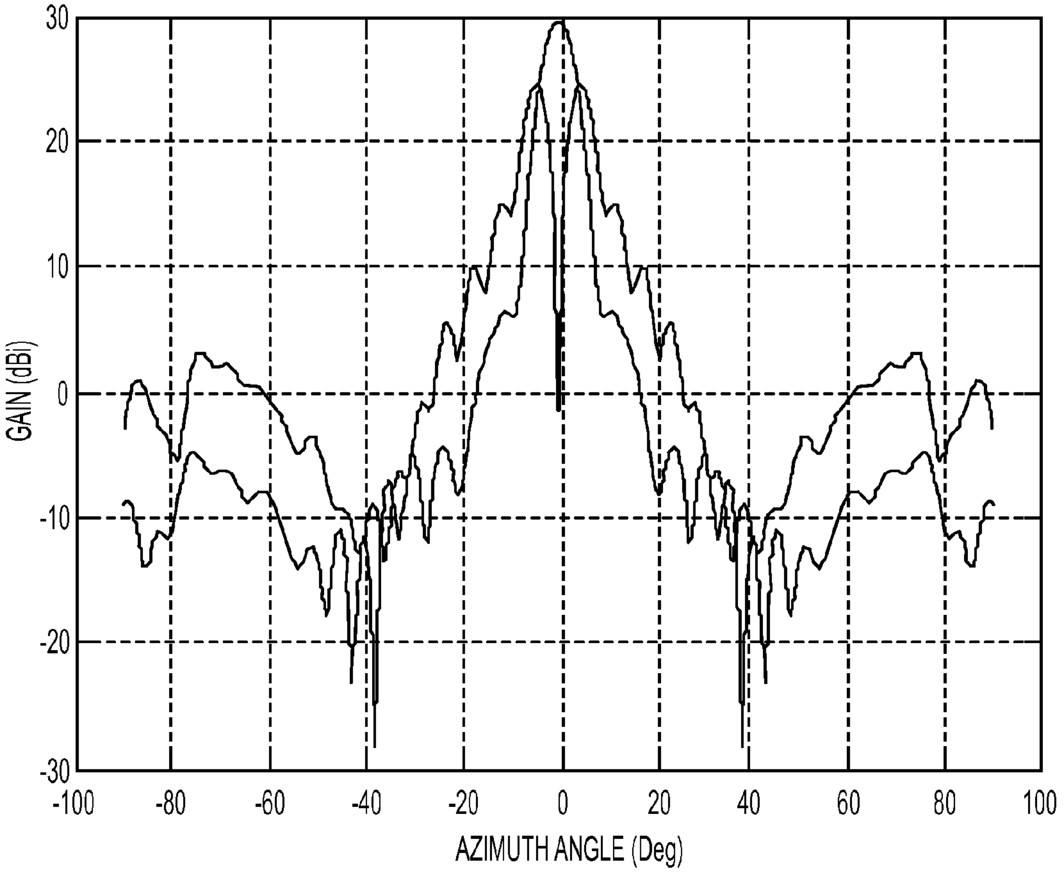
FIG. 5 is a graph of the sum and difference patterns of an antenna according to the present invention that allow for direction finding.

There is seen in FIG. 5, a graph of the sum and difference patterns for an antenna 10 according to the present invention. In this example, lens 12 of antenna 10 was shaped to apply a Taylor weighting to the beam patterns, which reduces the level of the sum beam sidelobes and increases the level of the difference beam sidelobes. This arrangement causes the difference beam sidelobes to sufficiently cover the sum beam sidelobes. If the output ports are connected to a filter and power meter, as described above, the user would be able to monitor the power levels and record when the sum beam signal was greater than the difference beam signal. This would correspond to the direction of the signal source.

What is claimed is:

1. A lens antenna for direction finding in the Ka-band, comprising:

a pair of patch antennas, each of which includes a feed and is adapted to radiate and receive polarized electromagnetic signals in the Ka-band spectrum;

a 180 degree coupler connected to the feeds of the patch antennas and arranged to generate a sum signal and a difference signal based on the received signals; and a dielectric lens associated with said patch antennas and having a predetermined shape for focusing the radiated signals into a sum pattern and a difference pattern that reduces any side lobes in said sum signal and increases any side lobes in said difference signal so that the difference beam side lobes cover the sum beam side lobes.

2. The lens antenna of claim 1, wherein a return signal is determined to be in the main beam if the sum signal is greater than the difference signal.

3. The lens antenna of claim 1, wherein said polarization is selected from the group consisting of linear polarization, left-hand circular polarization, and right-hand circular polarization.

4. The lens antenna of claim 1, wherein said patch antennas comprise microstrip patch antennas.

5. The lens antenna of claim 1, wherein said predetermined shape applies a Taylor weighting pattern to received signals.

6. A method of direction finding in the Ka band, comprising the steps of:

providing a dielectric antenna lens having predetermined shape for focusing radiated signals into a sum pattern and a difference pattern that reduces any side lobes in said sum signal and increases any side lobes in said difference signal so that the difference beam side lobes cover the sum beam side lobes;

radiating signals through said dielectric antenna lens using a pair of patch antennas, each of which includes a feed for radiating and receiving polarized electromagnetic signals in the Ka-band spectrum;

receiving said radiated signals;

generating a sum signal and a difference signal based on the received signals; and locating the direction of said received signals based on when the sum signal is greater than the difference signal.

7. The method of claim 6, wherein the step of generating a sum signal and a difference signal based on the received signals comprises the step of using a 180 degree coupler connected to the patch antennas and arranged to generate a sum signal and a difference signal based on the received signals.

8. The method of claim 6, wherein the polarization of said polarized signals is selected from the group consisting of linear polarization, left-hand circular polarization, and right-hand circular polarization.

9. The method of claim 6, wherein said patch antennas comprise microstrip patch antennas.

10. The method of claim 6, wherein the predetermined shape of said dielectric antenna lens applies a Taylor weighting pattern to received signals.

* * * * *